United States Patent [19]
Sassa et al.

[11] Patent Number: 5,891,402
[45] Date of Patent: Apr. 6, 1999

[54] CATALYST RETAINING APPARATUS AND USE IN AN OZONE FILTER

[75] Inventors: Robert L. Sassa, Newark, Del.; Alex R. Hobson, Elkton, Md.; Jeffrey C. Towler, Norwood, N.Y.; James H. Bushong, Newark, Del.

[73] Assignee: W. L. Gore & Associates, Inc., Newark, Del.

[21] Appl. No.: 431,642

[22] Filed: May 2, 1995

Related U.S. Application Data

[63] Continuation-in-part of Ser. No. 204,910, Mar. 2, 1994, abandoned.

[51] Int. Cl.$^6$ .............................. B01D 50/00; A62B 7/08; B27J 5/00
[52] U.S. Cl. .................. 422/171; 422/177; 422/222; 422/122; 55/521; 55/524; 264/127
[58] Field of Search ................................ 422/170, 171, 422/177, 180, 222, 120, 122; 55/521, 524; 264/127, DIG. 48

[56] References Cited

U.S. PATENT DOCUMENTS

| | | | |
|---|---|---|---|
| 3,766,013 | 10/1973 | Forgione et al. | 195/63 |
| 3,953,566 | 4/1976 | Gore | 264/288 |
| 4,092,246 | 5/1978 | Kummer | 210/65 |
| 4,153,661 | 5/1979 | Ree et al. | 264/120 |
| 4,200,609 | 4/1980 | Byrd | 422/122 |
| 4,206,083 | 6/1980 | Chang | 252/455 R |
| 4,816,328 | 3/1989 | Saville et al. | 428/246 |
| 4,916,110 | 4/1990 | Manniso | 502/439 |
| 4,948,728 | 8/1990 | Stephanopoulos et al. | 435/41 |
| 4,966,718 | 10/1990 | Johnson | 210/776 |
| 4,976,857 | 12/1990 | Solomon | 210/493.5 |
| 4,985,296 | 1/1991 | Mortimer, Jr. | 428/220 |
| 5,019,140 | 5/1991 | Bowser et al. | 55/159 |
| 5,039,413 | 8/1991 | Harwood et al. | 210/457 |
| 5,070,694 | 12/1991 | Whittenberger | 60/300 |
| 5,096,473 | 3/1992 | Sassa et al. | 55/97 |
| 5,142,328 | 8/1992 | Yoshida | 355/215 |
| 5,187,137 | 2/1993 | Terui et al. | 502/241 |
| 5,213,882 | 5/1993 | Sassa et al. | 428/224 |
| 5,221,649 | 6/1993 | Yoshimoto et al. | 502/84 |
| 5,229,200 | 7/1993 | Sassa et al. | 428/280 |
| 5,232,886 | 8/1993 | Yoshimoto et al. | 502/84 |
| 5,262,129 | 11/1993 | Terada et al. | 422/122 |
| 5,273,560 | 12/1993 | Kadoya et al. | 55/498 |

FOREIGN PATENT DOCUMENTS

| | | |
|---|---|---|
| 0038224 | 10/1981 | European Pat. Off. . |
| 0057990 | 8/1982 | European Pat. Off. . |
| 0403984 | 12/1990 | European Pat. Off. . |
| 1311864 | 11/1962 | France . |
| 2917234 | 10/1981 | Germany . |
| 1419682 | 12/1990 | Germany . |
| 4-235718 | 8/1992 | Japan . |
| 4-342744 | 11/1992 | Japan . |
| 5004247 | 1/1993 | Japan . |
| 910276934 | 6/1993 | Japan . |
| 2258622 | 11/1968 | United Kingdom . |

*Primary Examiner*—Christopher Kim
*Attorney, Agent, or Firm*—David J. Johns; Carol A. Lewis White

[57] ABSTRACT

The present invention is an improved apparatus and method for using a catalyst to remove contaminants from a fluid stream. Catalytic particles are enmeshed within a highly porous expanded polytetrafluoroethylene (PTFE) substrate. The use of an expanded PTFE substrate provides added strength to the substrate and provides open and uniform porosity, thus, assuring proper exchange of molecules between the exterior surface of the substrate and the catalytic particles held within it. As such, the present invention is particularly suitable for use as a cross-flow filter for use in ozone generating office equipment (e.g., an electro-static photocopy machine) or similar application requiring minimal pressure drop across the filter unit.

19 Claims, 6 Drawing Sheets

CATALYST RETAINING APPARATUS AND USE IN AN OZONE FILTER

RELATED APPLICATIONS

The present application is a Continuation-in-Part application of U.S. patent application Ser. No. 08/204,910 filed Mar. 2, 1994 abandoned.

BACKGROUND OF THE INVENTION

1. Field of the Invention

The present invention relates to apparatus and methods for reacting a catalyst with a fluid, such as for the placement and operation of an ozone decomposing catalyst in a fluid stream.

2. Description of Related Art

Catalysts are used in a variety of applications to alter chemical compositions or remove unwanted contaminants. Such applications include both passive and active catalyst installations. In passive catalyst installations, a catalyst is installed in a fixed position (e.g., near a contaminant generation point in an apparatus) and it reacts with chemicals in a fluid that happen to flow past it. In active catalyst installations, a catalyst is installed in a system whereby a stream of fluid is forced past the catalyst (e.g., in a reactor process vessel, a liquid conduit or an air duct) to encourage the chemical reaction to occur.

One of the primary concerns in the use of catalysts is how to easily and securely install the catalyst while assuring that maximum surface area is available for reaction between the catalyst and the fluid to be treated. To this end, powders or other particle forms of catalyst can provide maximum contact area, but only if the particles can be arranged to permit the fluid to flow freely across their surfaces. This condition may make it difficult to install powdered catalysts in many applications since space is often limited and catalysts generally cannot be freely dispersed in a fluid stream. Further complicating the use of particulate catalysts is that they are not easily installed or retained in place. The attachment of catalysts to a substrate may make them much easier to handle, but inevitably reduces the exposed surface area of the catalyst.

An area of catalyst treatment that has received particular interest is in the use of catalysts to remove environmental contaminants from air and liquid fluid streams. For example, ozone decomposing catalysts are beginning to be recognized as superior to use of merely ozone removing chemicals (e.g., activated carbon) for many uses, such as in air purification systems (e.g., aerospace vehicle air supply), water disinfection applications, industrial corona treatment equipment, and photocopy machines and similar devices. Carbon and similar materials are not fully acceptable in these applications since these materials are consumed in the filtration process and its is often difficult to ascertain when these materials have reached the end of their useful life. By contrast, catalysts have much longer operating lives, decrease the amount of waste generated by the purification system, and tend to be more successful at removing contaminants over a longer period of time. While significant improvements can be realized with the use of catalysts in these applications, regretfully, the use of catalysts in these applications suffers from the installation problems outlined above.

One approach in supplying a catalyst is to bind the catalyst to the surface of a substrate. One example of this method is shown in U.S. Pat. No. 5,187,137 issued to Terui et al., where a thin film coating of manganese dioxide, lead, or lead oxide catalyst is bound to a support (e.g., an inorganic or metal or metal oxide material), preferably using a binder such as alumina sol. Another approach is disclosed in UK Patent 2,258,622 issued to Nichlas Corporation. In this instance, a fine powder of manganese dioxide is coated on a porous carrier paper made from inorganic fibers. Again, a binder such as alumina sol or polyvinyl alcohol is used to hold the catalyst in place. The patent warns that the amount of binder used should be kept to a minimum to avoid coating the catalyst and reducing its catalytic activity. Similarly, in U.S. Pat. No. 5,142,323 issued to Yoshida, a coating of catalyst, foaming agent, and binder is applied to a tape that can be installed in critical area within an electrostatic charge generating machine. All of these approaches are believed to have a number of deficiencies.

First, as has been acknowledged, the use of binders necessarily coats the catalytic particles in order to anchor them and reduces their effectiveness. While too much binder can severely reduce the function of the catalyst, too little binder may limit the amount of catalyst that can be applied in a given area or risks contamination of the fluid stream with catalytic particles. Of course, performance continues to degrade over the life of the filter as shedding continues.

Second, catalysts applied on the surface of a support are not well protected from attack or damage. For instance, surface particles can be fouled by contaminants carried in the fluid stream, such as dust, water, or water vapor. Additionally, the placement of catalytic particles on the surface of a support may leave them susceptible to contamination, damage, or loss where mechanical contact with the particles occurs or where washing or other treatment is necessary.

Japanese Laid-Open Patent Application 4-235718 to Japan Vilene Company, Ltd. dispenses with the use of a binder by embedding an ozone decomposing catalyst within a fibrillated polytetrafluoroethylene (PTFE) resin. By mixing the catalyst within the PTFE resin and then subjecting the mixture to a cutting or shearing force (i.e., performing blending, rolling, or extrusion), the catalyst can be securely bound within a fibrillated PTFE structure without considerable coating of PTFE polymer and without the introduction of a binder material. The patent goes on to teach that voids should be formed in the final product through: blending, rolling, or extruding; introducing a foaming or pore forming agent; or embossing or perforating the support material. The use of pore forming agents is identified as being particularly beneficial, such as using alcohol, polyvinyl pyrrolidone, dimethyl phthalate, diethyl phthalate, ethylene glycol, or naphtha. Suggested foaming agents include inorganic foaming agents (e.g., sodium hydrogen carbonate, ammonium carbonate), azo compounds, and sulfonyl compounds. The patent reports good ozone removal properties by passing a stream of air perpendicularly through the PTFE material. This is attributed to a high probably of contact between the air to be filtered and the catalytic particles within the support material as the air is passed through the PTFE material.

Although the material disclosed in Japanese Laid Open Patent Application 4-235718 appears to address some of the previous problems in binding a catalyst to a substrate, this material continues to have a number of serious limitations. First, the Japanese application does not address how to produce an improved support material that is useful where only cross-flow surface filtration is desired. For many applications flow-through filtration demands excessive pressure drop that cannot be readily accommodated. For instance, cooling fans in electrostatic copiers are intentionally limited in size to reduce noise and electric consumption. A flow-through filter such as that disclosed in the Japanese Application is believed to be impracticable for these uses since too much air pressure will be required to maintain flow through the filter. Pressure drop may be even further increased over time when particles become embedded within the filter during operation, reducing filter effectiveness and requiring even greater air pressure to achieve proper air flow.

Furthermore, the material disclosed in Japanese Laid-Open Patent Application 4-235718 has limited void size control and distribution. That reference teaches that voids are produced by using a pore forming agent which generates very inconsistent void sizes that are difficult to control. The size and distribution of the void spaces within the catalyst material is critical to allowing the gas to reach the catalyst within the depth of the material. Since the efficiency of a filter can be significantly limited by the availability of the catalyst to the contaminated air, it is crucial that void volume is carefully and predictably controlled. the processes taught by the Japanese reference simply does not supply the predictability and control necessary to produce a fully acceptable filter device, particularly one to be employed in cross-flow filtration.

For these applications a cross-flow filter, where air flow occurs only across the exterior surface of the substrate, would be preferred. Unfortunately, the fibrillated PTFE material produced in the methods taught in the Japanese Application is considered to be of too limited porosity to allow effective air exchange between the exterior surface of the substrate and embedded particles in a cross-flow installation.

Another problem with the support material disclosed in Japanese Laid Open Patent Application 4-235618 is that the PTFE material described in the Patent Application is believed to be of limited strength, making it susceptible to leakage or even catastrophic failure. One possible solution to this problem might be to provide some form of support material to reinforce the PTFE material. This solution, however, may only increase the pressure drop across the filter.

Finally, the methods taught in the Japanese Application for producing the support material are considered quite dangerous due to the combustible combination of certain manufacturing chemicals and catalysts such as manganese dioxide. It has been determined that the combination of manganese dioxide with certain organics (e.g., isopropyl alcohol, naphtha, or ethylene glycol) results in the oxidation of the organics. This is particularly likely to occur at elevated temperatures. As a result, the processing of PTFE, manganese dioxide, and an organic foaming or pore forming agent must be carefully controlled to avoid risk of severe combustion. This condition is actually worsened when the combustible materials are removed by volatilization at elevated temperatures, as the Japanese Application recommends, or when the volatilization is carried out in a closed container and/or at elevated pressures. Lastly, even without such processing constraints, it is quite difficult to remove the processing chemicals completely following production. This can leave contaminates that may reduce the effectiveness of the catalyst in operation.

Accordingly, it is a primary purpose of the present invention to provide a substrate for containing a catalyst that securely contains catalyst without the use of a binder or other adhesive material that might reduce the catalyst's effectiveness.

It is another purpose of the present invention to provide a substrate for containing a catalyst that is both highly porous and contains controlled and evenly distributed pores throughout the material, allowing effective exchange of air between the exterior of the substrate and catalytic particles contained therein, even in cross-flow filtration installations.

It is still another purpose of the present invention to provide an improved cross-flow filter for the catalytic treatment of a fluid stream.

It is yet another purpose of the present invention to provide a method of producing an improved substrate for containing catalytic particles that can be safely practiced without risk of combustion.

It is a further purpose of the present invention to provide a method of producing an improved substrate for containing catalytic particles that avoids the introduction of performance diminishing contaminants during processing.

It is another purpose of the present invention to provide a catalyst containing material that is strong and flexible.

It is yet another purpose of the present invention to provide a catalytic filter that can be electrically grounded, charged or heated.

These and other purposes of the present invention will become evident from review of the following specification.

SUMMARY OF THE INVENTION

The present invention is a highly porous catalyst containing substrate material. The catalyst is enmeshed with a node and fibril structure of polytetrafluoroethylene (PTFE), which has been expanded in one or more directions, to produce a microporous matrix of polymeric nodes, fibrils, and catalytic particles entrapped therein. The expansion of the PTFE material produces a substantially improved porosity that allows for greater exposure of the catalytic particles throughout the matrix to air in cross-flow (i.e., surface) filtration applications.

Additionally, the expansion of the PTFE matrix produces a number of other significant improvements in the substrate material over previous catalytic substrate materials. The mechanical expansion of the PTFE material in accordance with the present invention, without the use of foaming or pore forming agents, avoids chemical contamination of the catalytic particles during processing and drastically reduces the likelihood of combustible reactions between catalysts and organic processing chemicals. Further, the use of an expanded PTFE matrix produces an increase in the matrix tensile strength of the material, making it far less prone to damage during handling or use.

DESCRIPTION OF THE DRAWINGS

The operation of the present invention should become apparent from the following description when considered in conjunction with the accompanying drawings, in which.

DETAILED DESCRIPTION OF THE INVENTION

Figure 1:
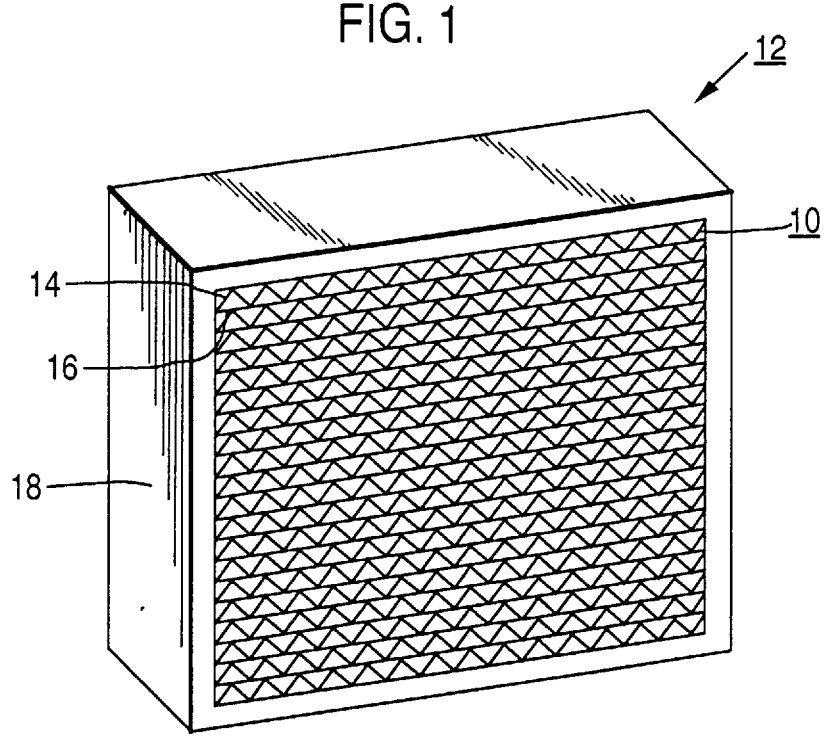
FIG. 1 is a three-quarter isometric view of a flow-through filter of the present invention.

The present invention is an improved combination of substrate and catalyst for use in a wide variety of applications. As the term "catalyst" is used herein, it is intended to include any material that allows a reaction to occur at lower activation energy and that is not consumed to any major degree in a reaction process.

The substrate of the present invention comprises an expanded polytetrafluoroethylene (PTFE) material of polymeric nodes and interconnected fibrils having catalytic particles entrapped therein. The expanded PTFE material is preferably made in accordance with U.S. Pat. Nos. 3,953,566 to Gore and 4,985,296 to Mortimer, Jr., both incorporated by reference.

The substrate material may be made in the following manner. First, a dispersion of PTFE material, such as that available from E. I. duPont de Nemours and Company, Wilmington, Del., is mixed with a desired catalyst or catalysts. In order to maximized available surface area for the catalyst, it is preferred that the catalyst is in the form of a particulate. Mixing can occur through any suitable means, such as through blending in a baffled mixing vessel. Once a slurry is created, the mixture is then dried, such as in a convection oven. The dried material can then be screened into a powdered form.

The screened material is then lubricated to assist in processing. Due to the combustible combination of certain catalysts with organic materials, it is preferred that a non-reactive lubricant be employed, such as a lubricant of water mixed with a flurosurfactant. The fluorosurfactant reduces the surface tension of the water which allows the fluid to wet the powder material and adequately lubricate it. Using this lubricant eliminates the possibility of spontaneous reaction with organic solvents. The mixture may then be chilled, passed through another screen, and then tumbled.

The tumbled material can then be formed into a pellet or other suitable shape, such as through a vacuum and pressing process. The pellet can then be heated and extruded, calendered, or otherwise formed into a final sheet or tape. To reduce the thickness of the sheet, it may be calendered further to approximately a final desired thickness.

The flattened sheet should then be subjected to heat and stretching in one or more dimensions to create an expanded PTFE matrix. Stretching should occur at a temperature of about 180° C. to about 240° C. and at a ratio of 1.1 to 1 up to 100 to 1, or more. The preferred amount of expansion for use in the present invention is believed to be about 2:1 to 15:1. The rate of expansion may be anywhere between 0.10% to 10,000% per second, preferred for the present invention being a lower stretch rate of about 10 to 300% per second.

The preferred final product should have about the following final properties: porosity of about 10 to 99%, with preferred being about 60 to 90%; percentage of PTFE of 5 to 99%, with preferred being about 20 to 92%; and a thickness of about 0.0002 to about 0.125 inches (0.0051 mm to 3 mm), with a preferred thickness being about 0.001 to about 0.015 inches (0.025 mm to 0.38 mm).

Unlike many previous attempts to incorporate a catalyst on a substrate, the present invention combines the catalyst and the substrate precursor material during the production process of the substrate. In this manner, the catalyst is enmeshed within the PTFE structure itself, without the need for binders or other adhesives to hold the catalyst in place.

Moreover, unlike previous attempts to combine a catalyst within a fibrillated PTFE material, the substrate of the present invention comprises a mechanically expanded PTFE material having many improved properties over merely sheared PTFE. The primary advantage of this method of production is that a significantly improved porosity is provided—maintaining a high degree of porosity while having relatively small and uniform pores. In this respect, the present invention can provide a more porous material than a sheared PTFE product, but, more importantly, the present invention provides a product with far more uniform porosity. Accordingly, the present invention provides a more even and predictable surface for the flow of chemicals across embedded catalytic particles, provides a large amount of exposed surface area, and provides stable retention of catalytic particles within the matrix.

Figure 2:
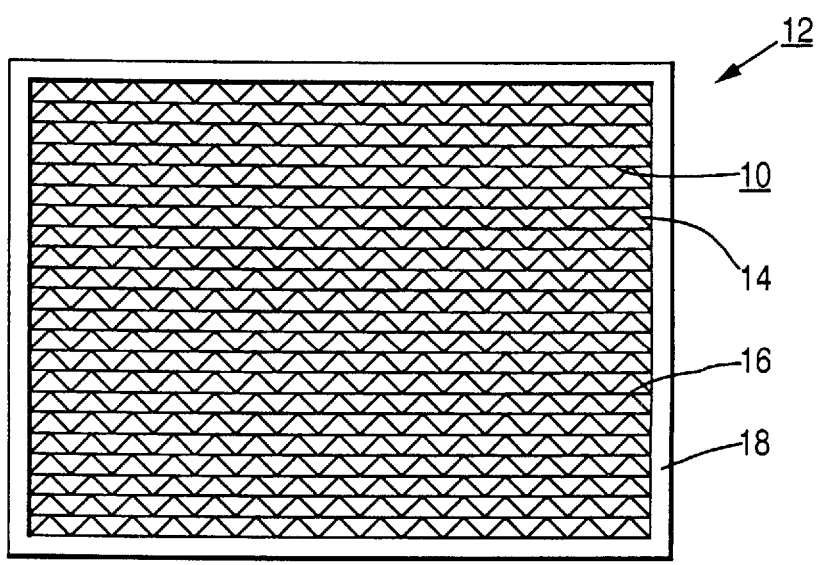
FIG. 2 is a front elevation view of a flow-through filter of the present invention.

FIGS. 1 and 2 show a chemically reactive substrate 10 of the present invention mounted in a cross-flow filter unit 12. In this instance, the filter unit 12 is constructed for placement in a fluid conduit, such as a gas conduit found in aircraft or ozone producing office equipment (e.g., electrostatic copier, printer, or facsimile machines). This unit 12 comprises alternating layers of pleated or otherwise corrugated reactive substrate 14 and flat reactive substrate 16 all mounting in a frame 18. The purpose of this design is to maximize the exposed surface area of the reactive substrate 10 that will come in contact with fluid passing across its surface while producing a minimal pressure drop across the filter unit 12 as a whole.

Figure 3:
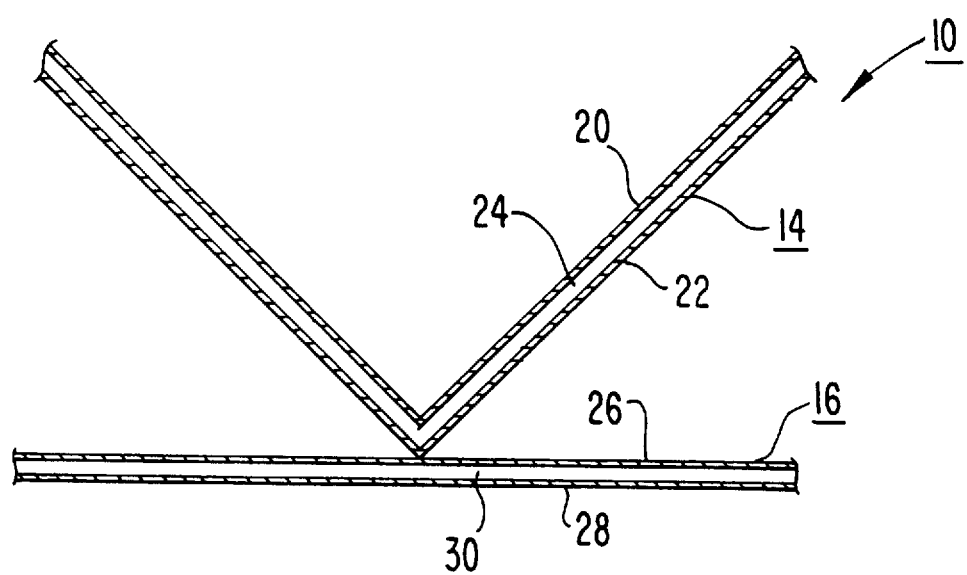
FIG. 3 is an enlarged front elevation view of a portion of a filter element of the present invention.

FIG. 3 shows a detailed presentation of the construction of the chemically reactive substrate 10. The corrugated layer 14 comprises two layers 20, 22 of reactive substrate of the present invention mounted on either side of a malleable core material 24. Suitable core materials include: metal foils (e.g., copper, aluminum, titanium); fabrics, wovens or non-wovens (e.g., REEMAY® spun bound polyester, NOMEX® spun bound or laced materials, or polyimides); plastic films (e.g., polyethylene, polyester, or nylon); inorganic or mineral based layers (e.g., fiberglass, papers, mats, or quartz); an organic fire retardant material (e.g., polyimides); or similar materials.

The flat layer 16 comprises two layers 26, 28 of the reactive substrate of the present invention mounted to a core material 30. The core material 30 may comprise any suitable material, such as those listed above. Alternatively, it may be possible to dispense with a core entirely in the flat layer 16. For ease in manufacture, it is preferred that both layers 14, 16 are constructed from identical material.

Once constructed in this manner, the layers are stacked together and mounted within the frame 18. A mesh screen, retaining wire, potting, or any other suitable means may be employed to retain the layers within the frame during handling and use. It should be appreciated that the filter unit may be constructed from a variety of different materials and in a variety of different shapes, sizes and configurations to suit particular applications.

Figure 4:
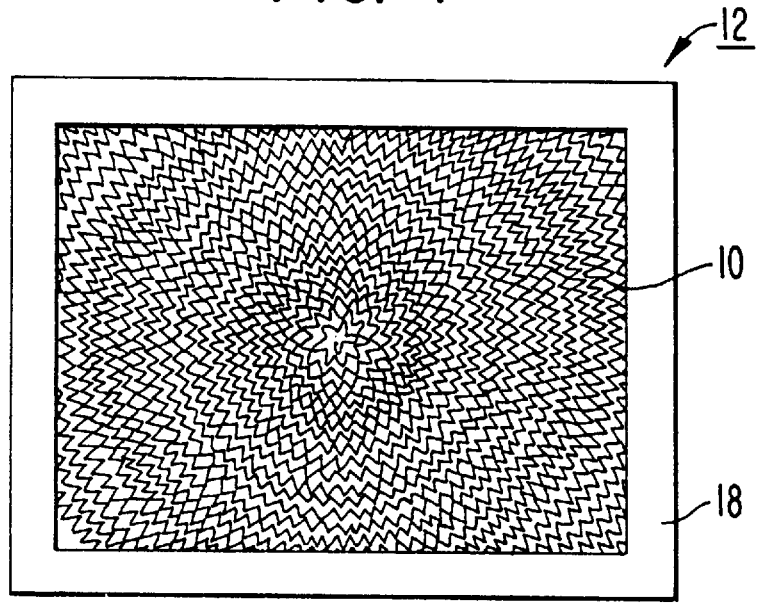
FIG. 4 is a front elevation view of another embodiment of a cross-flow filter unit of the present invention.

Another construction of the filter unit of the present invention comprises that shown in FIG. 4. In this instance, the corrugated reactive substrate 10 is formed with a flexible core material and then helically wrapped in a "jelly roll" fashion. The rolled material may then be mounted in a frame 18. This process may be easier to construct on a full scale production basis and may permit greater flexibility in the form of the reactive substrate layer and the frame in which it may be mounted.

Figure 5:
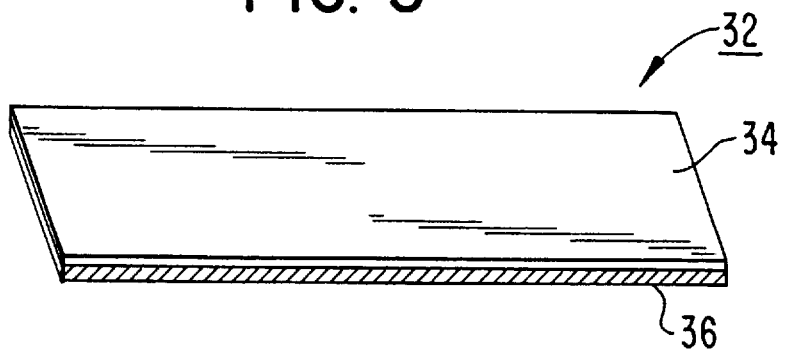
FIG. 5 is a three-quarter isometric view of a passive filter unit of the present invention.

Still another construction of the present invention is shown in FIG. 5. In this instance, a filter unit 32 comprises a passive filter that can be mounted virtually anywhere filtration is desired. The preferred passive filter comprises a reactive substrate 34 and an optional adhesive material or layer 36 attached to one surface of the substrate 34. The adhesive layer 36 allows the filter 32 to be retained in place. Any suitable adhesive may be employed in this embodiment so long as reactivity with embedded catalysts is considered.

Depending upon application, the present invention may be incorporate many different catalysts. For removal of ozone, manganese dioxide is preferred, but other suitable catalysts include: copper oxide, titanium dioxide, platinum, palladium, and alumina.

Additionally, catalysts can be plated on a base material, such as high surface area carbon, to maximize exposed surface area for catalytic reaction. It may also be useful to add other components, such as carbon, activated carbon, silicon dioxide, zeolite, etc., to provide other properties to the filter.

Other catalysts which may likewise be used with the present invention for other applications include those listed above as well as titanium, cobalt, rhodium, noble metals supported on zeolite, zeolites complexed with metal cations, or iron (e.g., Fe(II)), for example. The use of catalysts is particularly useful in selective catalytic reactions of environmentally unstable hydrocarbons or other chemicals, such as $NO_x$ and $SO_x$, and may be incorporated in filter bags, filter apparatus, batteries, or fuel cells, for example.

Figure 6:
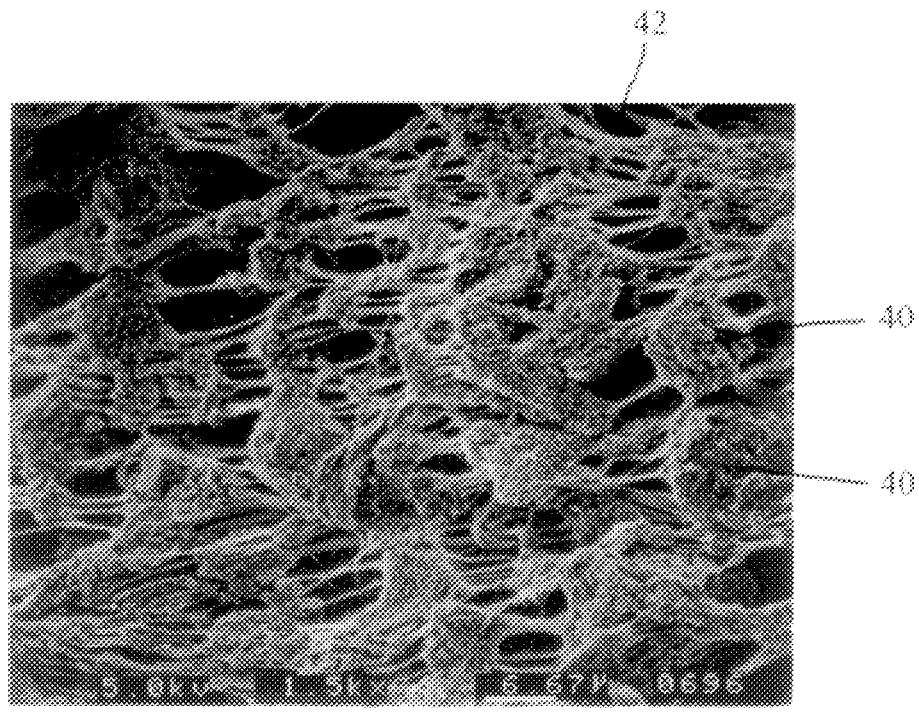
FIG. 6 is a scanning electron micrograph of a surface of a filled expanded polytetrafluoroethylene (ePTFE) material of a present invention.
Figure 8:
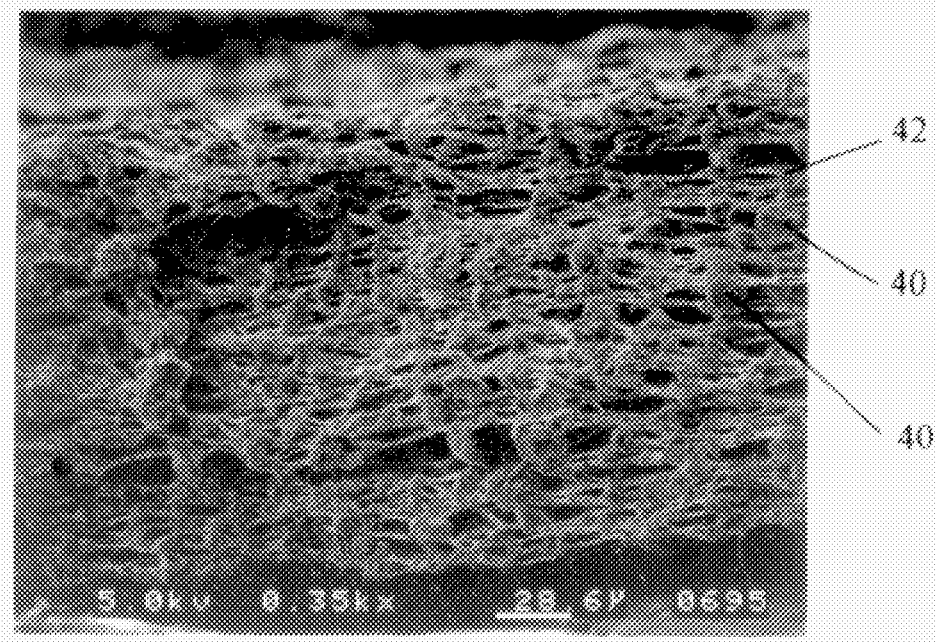
FIG. 8 is a scanning electron micrograph of a cross-section of a filled ePTFE material of the present invention.
Figure 10:
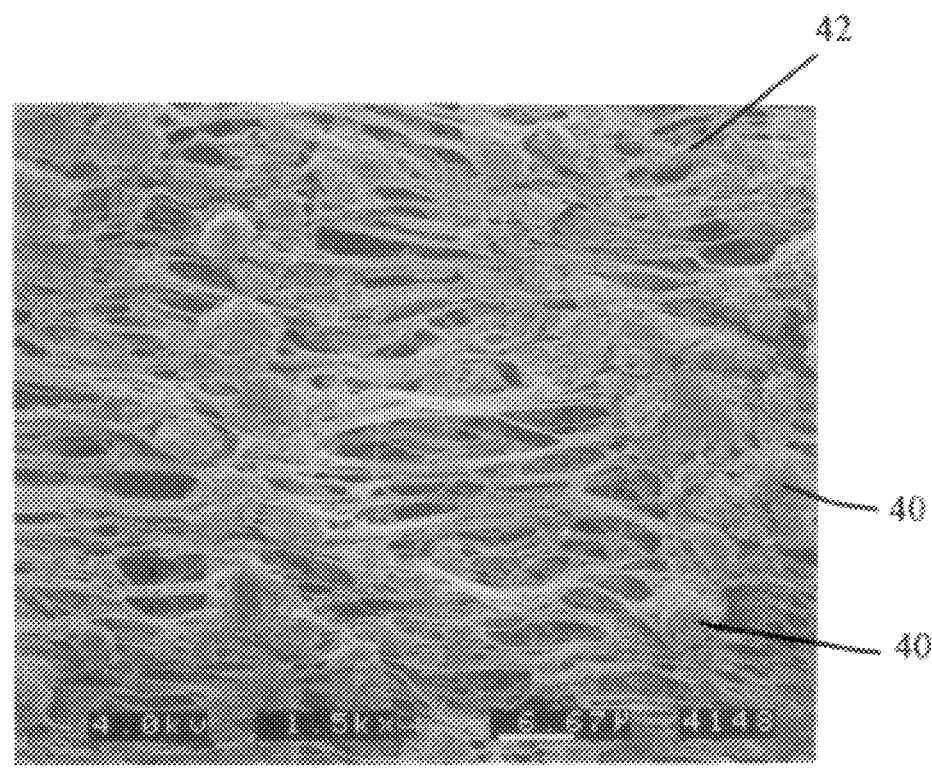
FIG. 10 is a scanning electron micrograph of a surface of a filled expanded polytetrafluoroethylene (ePTFE) material of the present invention.

FIGS. 6, 8 and 10 show the expanded PTFE material of the present invention. As shown therein, catalytic particles 40 are suspended within, and are held by, the fibrillated PTFE 42. As is shown, the catalytic particles are evenly dispersed, and the voids are uniform across the material. In addition, the size of the void spaces can be easily controlled by the amount of expansion the material is subjected to. By describing the particles as being "evenly dispersed," and the voids as being "uniform across the material," it is meant that the quantity of particles in any given area of a sample of the inventive material, and the size and distribution of the void spaces in any given area of a sample of the inventive material, do not vary more than about 25% from any other area of the sample.

Figure 7:
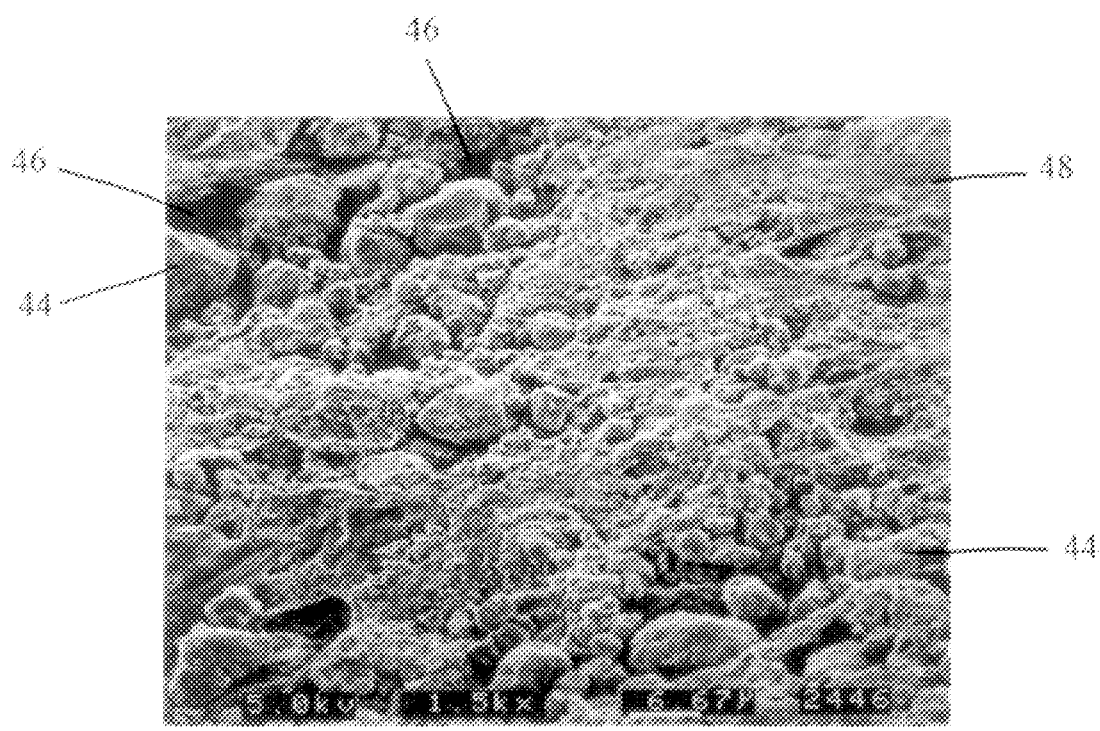
FIG. 7 is a scanning electron micrograph of a surface of a comparative material made in accordance with Japanese Laid Open Patent 4-235718.
Figure 9:
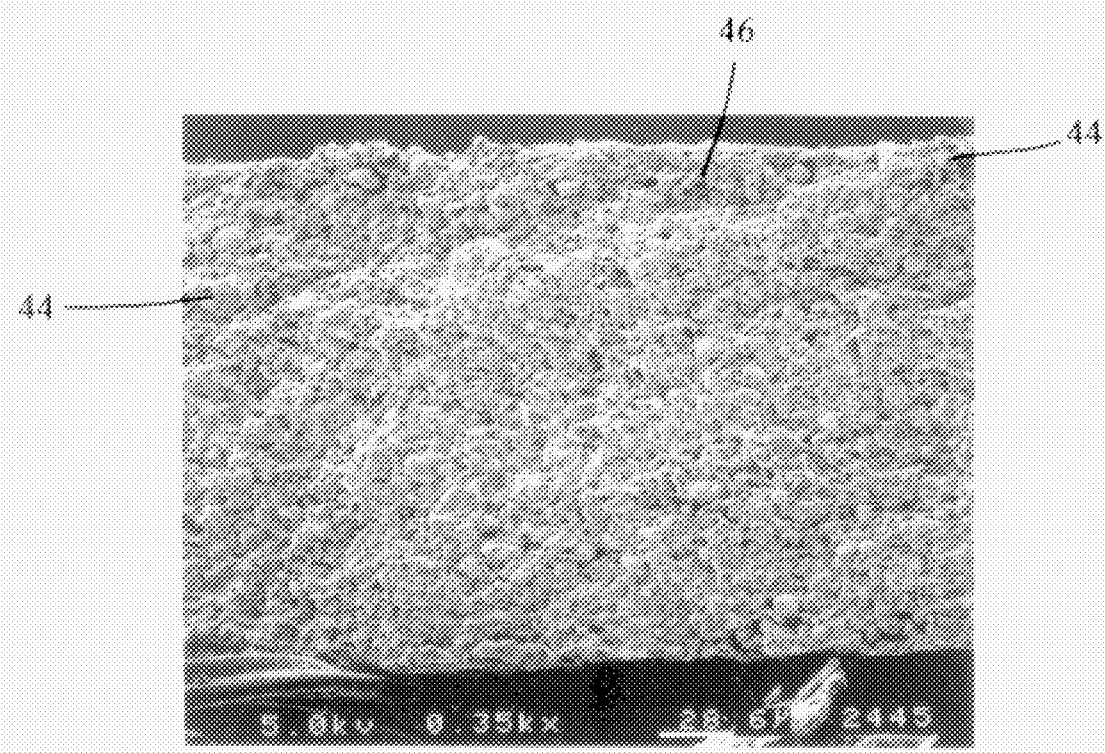
FIG. 9 is a scanning electron micrograph of a cross-section of a material made in accordance with Japanese Laid Open Patent 4-235718.

FIGS. 7 and 9 show the surface of the material made in accordance with the Japanese Patent Application 4-235718 to Japan Vilene Company. As is shown, catalytic particles 44 are clumped together in a random array with little or no orientation. In addition, void spaces 46 are also random in size and distribution and are not oriented in any manner. Furthermore, PTFE resin 48 has been sheared over the surface, and has covered many of the catalytic particles, which of course, eliminates their effectiveness.

Figure 11:
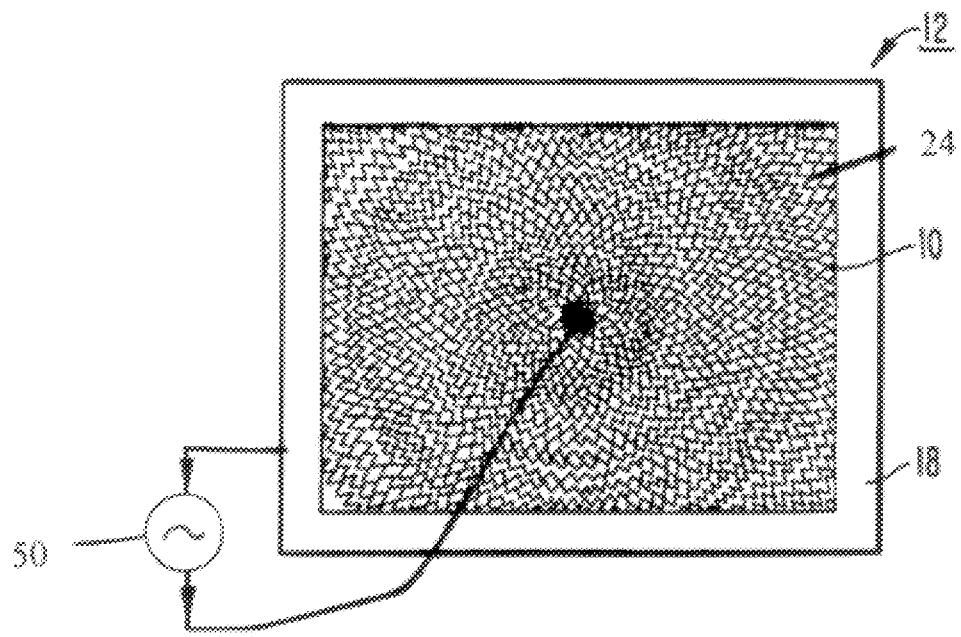
FIG. 11 is a functional diagram of a catalytic filter of the present invention which is electrically connected to an external power supply.

FIG. 11 shows another embodiment of a cross-flow filter unit 12 of the present invention, incorporating the malleable core material 24, which is illustrated as a metal foil. As should be understood, the malleable core material 24 may also be any electrically conductive material. As best illustrated by FIG. 3, the core material 24 is illustrated positioned between the filled ePTFE membranes 20 and 22. The malleable core material of FIG. 11 is shown connected to an electrical power source 50. The electrical power source 50 can be used to electrically heat the filter unit 12. The heat is generated by the current passing through the electrically conductive malleable core material 24. This heating may enhance the rate of catalytic conversion within the reactive substrate 10, which may increase the performance of the filter unit 12. For example, ozone is a very unstable gas that will break down and decompose at an elevated temperature. Therefore, raising the temperature of the filter unit 12 improves the decomposition rate of ozone or other compounds to be decomposed, which are also thermally unstable.

A study of these two different structures, (the ePTFE membrane of the present invention, and the material of the Japan Vilene Company, FIGS. 7 and 9), shows that these materials are dramatically different. The materials have much different mass transfer properties of a gas into the matrix, which is a critical property for catalytic filtration of gasses. In addition, void sizes and distribution is much different, which results in different catalytic decomposition rates of gases. Finally, void size and distribution of the filled ePTFE of the present invention allows for this material to be used in a cross-flow filtration manner. The diffusion of the cross flowing air is high enough to allow for adequate gas catalytic particle interaction within the bulk of the material. The Japanese reference teaches against cross-flow and describes using that material in a through flow manner. Cross flow is identified as being inefficient and a waste of material.

Another significant improvement with the use of an expanded PTFE material is that matrix tensile strength is dramatically increased. This increase in tensile strength assures membrane integrity during handling and use. The chart below shows the much improved tensile strength achieved with the filled ePTFE membrane of the present invention over the material shown in FIGS. 7 and 9. The chart also shows the much improved flex fatigue properties of the material of the present invention.

| Material made in accordance with | Matrix Tensile (psi) | % Elongation @ Break | Density g/cc | # of Flex @ Break |
|---|---|---|---|---|
| Example 3: | 150 | 48 | 1.46 | 300 |
| Example 1: | 4842 | 74 | 0.97 | 10051 |
| Example 2: | 10000 | 56 | 0.63 | 84500 |

As can be seen, the catalytically loaded material of the present invention has dramatically improved flex fatigue properties. This high flexibility is important in filter processing step and in some final applications of the material.

The flex testing was performed following ASTM D2176-89 (Reapproved 1993) Standard Test Method for Folding Endurance of Paper by the M.I.T. Tester. The M.I.T. Folding Tester apparatus as described in Section 4 of ASTM D2176-89, was used for this testing. The grip jaws used were 03 type, whereby the opening between the clamping part and the fixed part of the jaw is specified. The weight applied was ½ pound (227 g). The temperature range was approximately 70° F.±5° F. and the relative humidity was maintained at approximately 65±2%.

The material of the present invention has much greater physical properties because of the structure of the expanded PTFE. The PTFE in the material of the present invention is fibrillated, as is evident in FIGS. 6 and 8. This fibrilation increases the strength and flex fatigue of the material. This controlled and oriented fibrilation is not possible using pore forming agents and the like, such as these described in Japan Laid Open Patent Application 4-235718.

In addition, the material of the present invention has much improved air flow and diffusion properties which is critical to the filter's effectiveness, especially in cross-flow filtration applications. The following chart compares the flow properties of the material of the present invention to those of the material made in accordance with the teachings of the Japan Laid Open Patent Application 4-235718.

| Material | Gurley Time (sec) | Thickness mm | Avg. Density g/cc |
|---|---|---|---|
| Example 3 | 294 | 0.239 | 1.28 |
| Example 1 | 15.7 | 0.173 | 0.885 |
| Example 2 | 13.8 | 0.142 | 0.458 |

The Gurley air flow test measures the time in seconds for 100 cc of air to flow through a one square inch sample of material at 4.88 inches of water pressure. The sample is measured in a Gurley Densometer (ASTM 0726-58). The sample is placed between clamp plates and then a cylinder is dropped gently. The automatic timer, or stopwatch is used to measure the time (seconds) required for a specific volume recited above to be displaced by the cylinder. This time is the Gurley number.

It is important to note that the material of the present invention has an order of magnitude higher permeability to air than the material made in accordance with the teachings of previous catalysts bonded materials. This high permeability allows the fluid to be treated to move within the depth of the material where the catalytic particles are held. The oriented node and fibril structure of the material of the present invention provides a controlled amount of air diffusion into the depth of the material. This is why the material of the present invention may be used in a cross-flow filtration application.

FIG. 6 is a scanning electron micrograph of the surface of the material of the present invention made in accordance with Example 2. The material is 50% filled with manganese dioxide which contains 10% copper oxide, and is expanded 4 to 1. The micrograph is at 1,500 times magnification. The catalytic particles 40 are held within the matrix by the fibrillated PTFE 42. The void spaces are controlled in both size and orientation through the expansion process. The oriented and evenly distributed void spaces allow for good air penetration into the depth of the material where more catalytic particles are held.

The micrograph of FIG. 7 demonstrates that because this material is not mechanically expanded, there is no fibrillation of the PTFE. The catalytic particles 44 are clumped together in a random array. In addition, the void spaces 46, are few and random in both size and distribution across the surface. This void space distribution and size will result in a poor flow of air through the material and a poor flow of fluid into the material. In essence, only the catalytic particles on the surface will be effective in the decomposition of gases. The catalytic particles held beneath the surface will be ineffective.

FIG. 8 is scanning electron micrograph of the cross-section of the material of the present invention prepared in accordance with Example 2. The micrograph is at 350 times magnification. As is shown, the catalytic particles 40 are evenly distributed throughout the thickness of the material. In addition, the void spaces 46 are of uniform size and distribution throughout the thickness. Again, this structured void space and even distribution of the particles allows for the fluid to easily pass into the material and interact with the catalytic particles within the depth of the material.

FIG. 9 is a scanning electron micrograph of the cross section of the material made in accordance with the teachings of the Application 4-235718. The magnification of the micrograph is 350 times. The micrograph shows that the catalytic particles 40 within the material are clumped together in no specific orientation. In addition, the void space 46 are small and randomly distributed. With this structure, air does not readily and quickly flow into the depth of the material. Therefore, the catalytic particle within the depth of the material are not readily available. This is why the material of the Japanese reference teaches that the material is preferably punched with holes to improve the air transport through the material.

FIG. 10 is a scanning electron micrograph of the surface of the filled expanded PTFE membrane of the present invention made in accordance with Example 4. Again, note the even distribution of the catalytic particles within the fibrillated PTFE matrix. As is illustrated, at high catalytic particle loading levels, such as 70% for example, the filled expanded PTFE membrane maintains a uniform and oriented structure.

Without intending to limit the scope of the present invention, the following examples illustrate how the present invention may be made and used:

EXAMPLE 1

A catalytic ozone media membrane comprising 50% by weight $MnO_2$ with approximately 10% CuO from Carus Chemical in Ottawa Ill., was made. 1500 g of Carulite from Carus Chemical was mixed with 1500 g of PTFE in dispersion from Dupont of Wilmington, Del. The mix was coagulated and de-watered. The resulting coagulum was dried at 165° C. for 24 hours and then frozen. The chilled coagulum was then screened through a ¼"×¼" (mm×mm) mesh to leave a powder that was lubricated at 0.7 g/g with an 8.75% APFO water solution. The fluorosurfactant described, ammoniumperfluorooctanoate (APFO), is available from Dupont, of Wilmington Del. The lubricated powder was then pelletized at 1000 psi and extruded to yield a 0.040" (1.0 mm) thick by 4" (102 mm) wide tape. This tape was calendered to approximately 7 mils and dried at 200° C.

EXAMPLE 2

A catalytic ozone media membrane comprising 50% by weight ozone decomposing catalyst was made and tested for ozone decomposition efficiency. The material was made in accordance with Example 1, above, and subsequently expanded 4:1 at approximately a rate of approximately 50%/sec.

The tape was then used to construct a cross-flow filter. The tape was bonded to either side of a 0.003 (0.076 mm) thick tempered aluminum foil using a thermoplastic adhesive. The laminated tape/foil was then cut into 0.75" strips and then pleated using a gear pleater to provide a pleat height of approximately 0.07" (1.78 mm). The pleated layer was laid onto straight, unpleated layer and the two layers were coiled up to produce a helical filter of approximately 2" (50 mm) diameter. This geometry provided a 0.1" (2.54 mm) water pressure drop at 150 ft/min (50 m/min) air velocity. The filter was challenged with a 1 ppm ozone gas rich air stream at 150 ft/min (50 m/min) air velocity, and the ozone decomposition efficiency of the cross-flow filter was initially 86%, and after 8 hours, it was approximately 76%. The room temperature during the test was maintained at between 21–24° C., and the humidity of the air in the test chamber was at or below 10% during the test. An Orec Modelo V1-0 Ozonator from Orec of Phoenix, Ariz., was used to generate and control the amount of ozone in the gas stream. An Orec Model DM-100 monitor was used to measure the upstream and downstream ozone concentrations.

EXAMPLE 3

An ozone catalytic particle filled material was made in accordance with the teaching of the Japan Laid Open Patent Application 4-235718 and tested for physical properties. As is taught, 80 g of a commercially available ozone decomposing catalyst provide by Carus Chemical Company of Ottawa Ill., was dispersed into a mixture of 40 g Isopropyl alcohol and 40 g dionized water. As this slurry was mixing, 31.1 g of Daikin D-2 PTFE dispersion at 64.3% solids was added. Upon continued mixing, this solution thickened into a dough-like substance, which was then thoroughly blended.

The resulting product was then repeatedly rolled in the longitudinal and transverse directions to yield a sheet with a thickness of approximately 15 mils. This sheet was then heated to 150° C. for one hour. The resulting material was a $MnO_2$/PTFE composite with a void content of about 66%.

The physical properties of the material were measured and are reported above. The material was extremely weak and would fall apart, crack and tear with very little handling. This material would not be suitable for ozone filter production. In addition, the process used to make this material is extremely dangerous. The Material Safety Data Sheet for $MnO_2$ states that the $MnO_2$ is reactive with organic solvents such as Isoproply Alcohol. The mixture could react and become volatile at any time during the process which not an acceptable method of making the material.

EXAMPLE 4

A 70% by weight catalytic particle filled expanded PTFE membrane was made and tested for ozone decomposition. 2100 g of $MnO_2$ powder from Carus Chemical was mixed with 900 g of PTFE dispersion from Dupont. The mix was coagulated and de-watered. The resulting coagulum was dried at 165° C. for 24 hours and frozen. The chilled coagulum was then screened through a 0.25" (6.35 mm) mesh to leave a powder that was lubricated at 0.7 g/g with a 12% APFO water solution. The lubricated powder was then pelletized at 1000 psi and extruded to yield a 0.040" (1 mm) thick by 4" (10 cm) wide tape. This tape was calendered to approximately 0.007" (0.18 mm) thick and dried at 200° C., and expanded 4:1 at approximately 50%/sec.

This membrane was then made into a helically wound cross-flow filter, as described in Example 3, and tested for ozone decomposition efficiency as described therein. The initial efficiency was 100%, and after 8 hours of continuous testing, was 99%. This efficiency far exceeds what is needed in most of the photocopier applications.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A chemically reactive substrate which comprises:

a porous oriented expanded polytetrafluoroethylene (PTFE) matrix comprising polymeric nodes interconnected by fibrils;

particles of a catalyst interconnected to the nodes and fibrils within the PTFE matrix;

wherein the porosity of the expanded PTFE matrix allows the catalyst particles to react with a flow of fluid contacting the substrate while the interconnection between the catalyst and the PTFE matrix resists shedding of the catalyst particles.

2. The chemically reactive substrate of claim 1, wherein the catalyst particles are selected from a group consisting of manganese dioxide ($MnO_2$), copper oxide, titanium dioxide, platinum, palladium, or alumina.

3. The chemically reactive substrate of claim 1, wherein the catalyst particles comprise an ozone decomposing catalyst; and the substrate is adapted to be installed in a fluid stream to remove ozone therefrom.

4. The chemically reactive substrate of claim 3, wherein the ozone decomposing catalyst is selected from a group consisting of manganese dioxide ($MnO_2$), copper oxide, titanium dioxide, platinum, palladium, and alumina.

5. The chemically reactive substrate of claim 3, wherein the chemically reactive substrate is incorporated into an ozone filter unit mounted in the fluid stream; and the flow of fluid is across an outer surface of the substrate.

6. The chemically reactive substrate of claim 1, wherein the substrate is bonded to at least one side of a core material; and the flow of fluid is a cross-flow across the substrate.

7. The chemically reactive substrate of claim 6, wherein the substrate and core material are pleated and mounted in a frame to form a filter unit; and the filter unit is adapted for installation within a fluid conduit.

8. The chemically reactive substrate of claim 7, wherein the substrate and core material are mounted into the frame in a corrugated manner.

9. The chemically reactive substrate of claim 7, wherein the substrate material comprises a flexible material;

the substrate and the core material are helically rolled; and the rolled substrate and core material are mounted into a frame.

10. The chemically reactive substrate of claim 1 wherein the matrix is expanded at least 2:1.

11. An ozone removing filter for use in ozone producing apparatus which comprises:

a porous substrate of expanded polytetrafluoroethylene (PTFE) matrix, the matrix comprising polymeric nodes interconnected by fibrils and the substrate having at least one exposed surface;

particles of ozone decomposing catalysts interconnected to the nodes and fibrils within the PTFE matrix, the particles being securely held within the matrix so as to resist shedding while being in open fluid communication with the exposed surface of the substrate;

wherein the substrate is adapted to be installed within the ozone producing apparatus so as to cause an ozone containing gas to pass across the exposed surface of the substrate and to allow the ozone decomposing catalysts to react with the gas to remove ozone therefrom.

12. The ozone filter of claim 11 wherein:
the substrate is mounted in a filter unit adapted to be placed within a stream of ozone containing gas; and
the filter unit is mounted in the stream of ozone containing gas so as to position the substrate substantially perpendicular to the stream of ozone containing gas, the gas passing across the exposed surface of the substrate.

13. The ozone filter of claim 12, wherein the substrate is mounted in a corrugated manner within the filter unit.

14. The ozone filter of claim 12, wherein the substrate is helically rolled and mounted within the filter unit to provide fluid flow between helically rolled layers of substrate.

15. The chemically reactive substrate of claim 11 wherein the matrix is expanded at least 2:1.

16. A chemically reactive substrate comprising:
a porous oriented expanded PTFE matrix comprising polymeric nodes interconnected by fibrils;
particles of a catalyst interconnected to the nodes and fibrils within the expanded PTFE matrix; and
an electrically conductive core material, wherein the porous oriented expanded PTFE matrix is bonded to at least one side of the core material, and wherein the expanded PTFE matrix allows the catalyst particles to react with a flow of fluid contacting the substrate while the interconnection between the catalyst and the PTFE matrix resists shedding of the catalyst particles.

17. The chemically reactive substrate of claim 16, wherein the electrically conductive core material is electrically connected to an external electrical power source.

18. The chemically reactive substrate of claim 16, wherein the electrically conductive core material is electrically grounded.

19. The chemically reactive substrate of claim 16 wherein the matrix is expanded at least 2:1.

* * * * *